July 18, 1933. R. L. GRUSS 1,918,697
SHOCK ABSORBING DEVICE
Filed Oct. 22, 1928
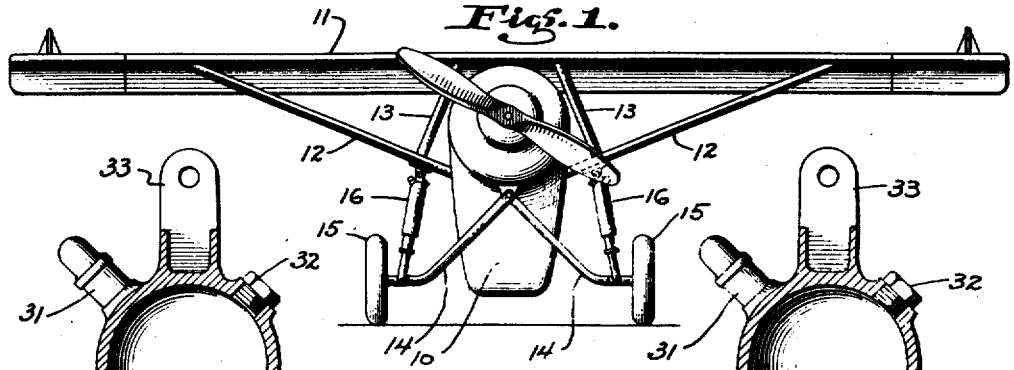
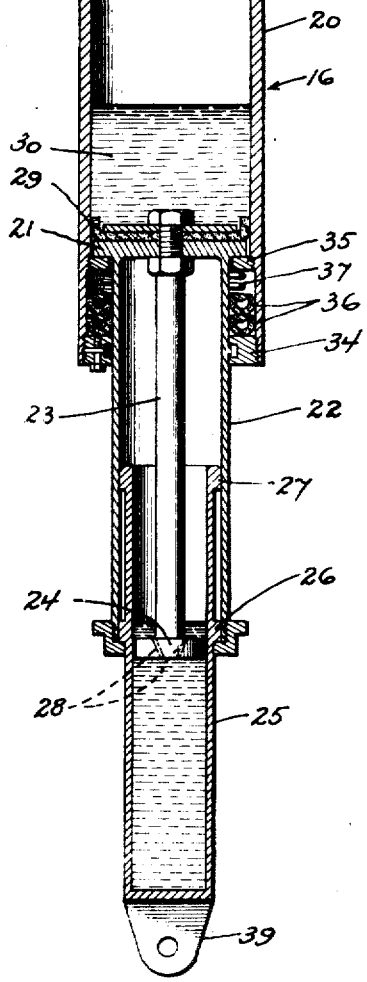
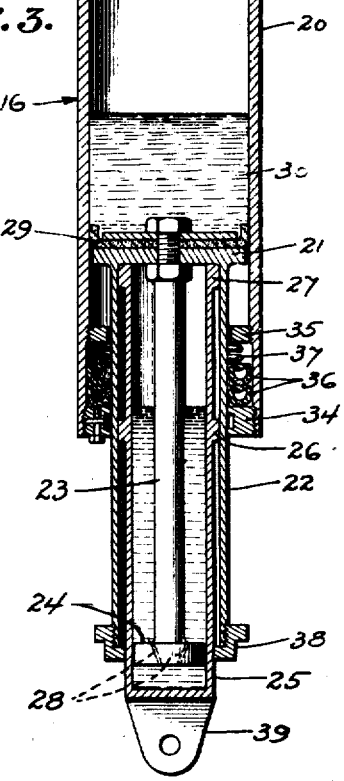
INVENTOR.
Raymond L. Gruss.
BY
Townsend, Loftus & Abbett
ATTORNEYS.

Patented July 18, 1933

1,918,697

UNITED STATES PATENT OFFICE

RAYMOND L. GRUSS, OF SAN FRANCISCO, CALIFORNIA; LAURA E. GRUSS, ADMINISTRATRIX OF SAID RAYMOND L. GRUSS, DECEASED, ASSIGNOR, BY MESNE ASSIGNMENTS, TO THE CLEVELAND PNEUMATIC TOOL COMPANY, OF CLEVELAND, OHIO, A CORPORATION OF OHIO

SHOCK ABSORBING DEVICE

Application filed October 22, 1928. Serial No. 313,966.

My present invention relates to pneumatic shock absorbing devices and more particularly to a device of this character suitable for use in connection with the landing gear of aeroplanes.

An object of my invention is to provide a novel arrangement of pneumatic shock absorbing devices in connection with the landing gear of aeroplanes.

Another object of my invention is to provide a novel type of pneumatic shock absorbing device which can be mounted in the position of a strut in applying the invention to the landing gear of an aeroplane.

A further object of my invention is to provide in combination with a pneumatic air cushion device, means for checking rebound which will permit of an extension of the shock absorbing device when the landing gear is out of contact with the earth.

For a better understanding of my invention, reference should be had to the accompanying drawing, wherein I have shown by way of illustration and not of limitation one manner of attaching my improved device and also the internal construction of a preferred modification of same.

In this drawing—

Figure 1 is a front view in elevation of an aeroplane equipped with my improved shock absorbing device, Figure 2 is a longitudinal sectional view of my device in its extended condition, and Figure 3 is a view similar to that of Figure 2 showing the parts in their collapsed position.

In Figure 1, 10 designates the fuselage having a wing structure 11 of the monoplane type. The wing structure 11 is supported upon the fuselage 10 by means of suitable struts 12 and 13 and connected to the fuselage at its central point I show a wheel axle 14 which is in two parts, each part being hinged at its inner end to the fuselage. Mounted upon the axles 14 are the usual landing wheels 15 and interposed between the axles 14 adjacent the wheels 15, I propose to mount my improved shock absorbing device or strut which I have designated by the numeral 16. The struts 16 are secured to the struts 12 at their upper ends with a hinged connection so that relative movement therebetween will be possible and at their point of attachment with the axle there is also a hinged connection.

With this arrangement it will be seen that when the wheels are in contact with the ground, the total weight of the plane will be carried upon the shock absorbing devices 16 and that when the wheels leave the ground, the device 16 will, under the influence of the air pressure therein, extend itself so that the wheels will assume a position further removed from the plane than here shown. This will permit the wheels to establish contact with the ground in landing before the weight of the plane is assumed thereby and, as a result, the weight of the plane will be slowly taken up by the air cushion as will hereinafter appear and thus the first shock and impact of landing will be absorbed by the full length of the air cushion, the pressure within the pneumatic cylinder starting at a low value and gradually increasing as the strut is compressed, thereby checking the downward motion of the plane in direct proportion to the force at which a landing is made.

The further aspect of my invention with respect to the rebound preventing characteristics thereof will best be understood in connection with a description of Figures 2 and 3. In these Figures of the drawing it will be seen that the shock absorbing device or strut 16 is comprised of an inverted pneumatic cylinder 20 and a piston head 21 adapted to operate therein when pressure is brought to bear thereupon by reason of external forces. The piston head 21 in this embodiment of my invention is shown as provided with a cylindrical portion 22 which extends out of the cylinder 20 and a rod 23 having an enlarged head 24 which also projects outwardly from the piston head and centrally of the cylindrical portion 22. Cooperating with the cylindrical portion 22 and the enlarged head 24 I also provide a second cylindrical portion or hydraulic cylinder 25 which is adapted to move vertically within the cylindrical portion 22 and is guided therein by means of annular bosses 26 and 27 formed thereupon. The cylinder 25 is adapted to contain oil or other liquid so that when pressure is brought to bear thereupon, it will telescope within the member 22 at a speed which will be determined by the fluidity of the liquid contained therein and the clearances for the flow of liquid between its walls and the enlarged head 24. In this connection it might be said that the enlarged head may, where desired, be provided with additional by-pass ports 28 for the purpose of increasing the flow of oil about the head 24 so that various rates of movement may be obtained. This feature, of course, can be modified in many respects: for instance, the enlarged head 24 may be made to have a rather close fit within the cylinder 25 and the by-pass of oil controlled through interior ports; or the head might be made relatively small so that all of the liquid flowing thereabout will pass around the outside thereof. The piston head 21 is shown as provided with an upstanding packing gland 29 and immediately thereabove within the pneumatic cylinder 20 I have shown a quantity of oil 30. The function of this oil is to lubricate the interior of the cylinder 20 and to act as a seal in combination with the gland 29 against the escape of the air from the cylinder 20. At the top of the cylinder 20 I provide a suitable air inlet and valve mechanism 31, the valve in this case being of the ordinary pneumatic tire type and adjacent thereto is a second plug 32 through which the oil is introduced into the cylinder. At the uppermost end of the cylinder and projecting vertically therefrom I form a pair of ears 33 which are adapted to be pivotally connected upon a suitable part of the aeroplane fuselage or struts. The lower end of the cylinder 20 is closed by a screw threaded annular plug 34 and a slight distance thereabove a second and similar plug 35 is provided which limits the downward movement of the piston head 20. In order to insure against the loss of oil at this point where the cylindrical portion 22 projects out of the cylinder 20 I provide between the annular plugs 34 and 35 a plurality of packing rings 36. These rings 36 are of standard design and have suitable spreaders and a spring 37 which tends to hold them in their expanded position.

At the lower end of the cylindrical portion 22 I provide an annular ring or nut 38 which serves as a closure member therefor and also limits the downward movement of the hydraulic cylinder 25. The lower end of the cylinder 25 carries a second pair of ears 39 similar to the ears 33 by means of which the lower end of my shock absorbing device 16 is secured to the axle 14 of the landing gear. In connection with the ears 33 and 39 it might be pointed out that instead of a pair of ears a single such member might be used. This will depend upon the nature of the cooperating coupling device or support.

The operation of my improved shock absorbing strut is as follows: It will be assumed that the cylinder 20 has been pumped up with air to a suitable pressure and that the plane to which it is attached is in the air and about to make a landing. Under these conditions the parts of my improved device will have assumed the positions in which they are illustrated in Figure 2 of the drawing. From this figure of the drawing it will be seen that the piston head 21 is in its lowermost position within the cylinder 20 with the cylindrical portion 22 projecting out of the cylinder 20. It will also be seen that the hydraulic cylinder 25 has assumed its lowermost or extended position. The position of the cylinder head 21 and its cylindrical portion 22 is occasioned by the pressure of the air within the cylinder 20 acting upon the piston head 21 and the position of the hydraulic cylinder 25 is the result of the weight of the under carriage structure and particularly the axle 14 and wheels 15. The oil or other liquid within the hydraulic cylinder 25 will have, as shown, assumed a position in the lowermost part of the cylinder and will extend substantially to the level illustrated in this figure of the drawing. When the wheels 15 of the aeroplane contact with the ground in landing, the first impact caused thereby will be taken up by the full length of deflection of the air as determined by the force of the impact and the pressure of the air maintained within the cylinder 20. After the wheels are in permanent contact with the ground, the air cushion will gradually pick up the weight of the machine and at the same time the hydraulic cylinder 25 will tend to slowly move upwardly over the enlarged head 24 carried by the rod 23 so that in the event that the wheels leave the ground during landing either due to sudden impact or uneven ground, the tendency to rebound will be checked hydraulically.

After the weight of the plane has been transferred to the wheels 15, the parts of my improved device will assume the position substantially as shown in Figure 3. When the parts are in this position, it will be seen that the piston head has moved upwardly within the cylinder 20 a distance depending upon the amount of pressure carried within the cylinder. It will also be seen that the hydraulic cylinder 25 has telescoped within the cylindrical portion 22 and that the oil therein has been displaced so that it now lies mostly above the enlarged head 24 carried by the rod 23. This figure of the drawing also illustrates the position of the parts during the taxiing period of the plane. From an inspection of this figure of the drawing it will be seen that the entire weight of the plane will be supported upon cushions of compressed air and that as the plane rises from the ground the air pressure within the cylinder will extend my device in proportion to the weight removed from the wheels and thus establish a condition wherein the greatest amount of flexibility under that weight will be automatically produced, thus relieving the plane of all jar and rack when taxiing over rough ground. In taking off, as the plane tends to rise, the device will extend itself and thus allow the compressed air in the cylinder 20 to expand and thus operate to support a portion of the load until the wheels finally leave the ground. At this time the hydraulic cylinder 25 will tend to slowly extend itself with respect to the cylindrical portion 22 as determined by the clearances therebetween the cylinder 25 and the enlarged head 24, and should it happen that the wheels again contact with the ground, the air cushion within the cylinder 20 will be immediately brought into play without necessitating a loss of altitude by the plane. The flow of liquid within the cylinder 25 will, as previously stated check the tendencies to any rebound and will also prevent a sudden extension of the shock absorbing device without detracting from the efficiency of the air cushion.

I have found that my device makes it possible to effect a much more rapid take-off and shorter landings. These characteristics I attribute particularly to the fact that the air cushion, once the wheels touch the ground, gradually assumes the weight of the machine, while at the same time the hydraulic cylinder permits the machine to settle with the wheels always in contact with the ground during this period and also the fact that the possibilities of rebound are substantially eliminated.

From the above, it will be seen that I have produced a new and improved type of shock absorbing device for aeroplanes and the like and while I have shown in the accompanying drawing a preferred embodiment thereof I desire to have it understood that many modifications thereof will readily suggest themselves to those skilled in the art to which my invention appertains without departing from the spirit and scope of the invention as defined in the appended claims.

Having thus described my invention, what I claim and desire to secure by Letters Patent is—

1. A shock absorbing device for aeroplanes comprising a pneumatic cylinder, a piston movable therein, a tubular extension carried by the piston and projecting from the end of the pneumatic cylinder, a hydraulic cylinder telescoping with the tubular extension and containing an incompressible fluid, and means movable with said tubular extension and working in said incompressible fluid for transmitting the movements of one of said cylinders to the other, whereby movement of the penumatic cylinder and the hydraulic cylinder with relation to each other in landing and taking off will be accompanied by a different movement of the piston with relation to the pneumatic cylinder.

2. A shock absorber for aeroplane landing gears comprising a penumatic cylinder, a piston therein, a tubular extension carried by the piston and extending from the mouth of the pneumatic cylinder, a hydraulic cylinder telescoping within the tubular extension and containing an incompressible fluid, a piston rod carried by the piston and extending longitudinally of the tubular extension and into the hydraulic cylinder, and means carried by the piston rod and at all times submerged within the incompressible fluid of the hydraulic cylinder to cause movement of the piston in a different degree and rate of speed as the pneumatic cylinder and the hydraulic cylinder move with relation to each other.

3. A shock absorbing device for aeroplane landing gears comprising a pneumatic cylinder, a piston reciprocable therein, a cylindrical extension carried by the piston and projecting from the mouth of the pneumatic cylinder, a hydraulic cylinder fitting within the cylindrical extension and being free to telescope with relation thereto, said cylinder enclosing an incompressible fluid, a piston rod secured to the piston and extending longitudinally into the hydraulic cylinder, a piston head carried at the end of said rod and at all times submerged in the incompressible fluid, and means incorporated in said head for permitting a metered flow of incompressible fluid amount the head, whereby force tending to move the pneumatic cylinder and the hydraulic cylinder longitudinally with relation to each other will cause the incompressible fluid to act upon the piston rod and piston to produce proportional movement of the piston head within the pneumatic cylinder whereby the energy incident to the relative movement of the pneumatic cylinder and the hydraulic cylinder will be dissipated.

4. A shock absorbing device for aeroplane landing gears comprising a pneumatic cylinder, a piston reciprocable therein, a cylindrical extension carried by the piston and projecting from the mouth of the pneumatic cylinder, a hydraulic cylinder fitting within the cylindrical extension and being free to telescope with relation thereto, said cylinder enclosing an incompressible fluid, a piston rod secured to the piston and extending longitudinally into the hydraulic cylinder, a piston head carried at the end of said rod and at all times submerged in the incompressible fluid, and by-pass openings through the head to accommodate the incompressible fluid whereby force tending to move the pneumatic cylinder and the hydraulic cylinder longitudinally with relation to each other will cause the incompressible fluid to act upon the piston rod and piston to produce proportional movement of the piston head within the pneumatic cylinder whereby the energy incident to the relative movement of the pneumatic cylinder and the hydraulic cylinder will be dissipated.

5. In a shock absorbing strut, an air cylinder, a hydraulic cylinder, and an intermediate element comprising two pistons each of which slides in one of said cylinders, the piston sliding in said hydraulic cylinder being constructed to permit a metered amount of liquid to flow past it, whereby the movement of one of said cylinders toward or away from the other cylinder is transmitted to the latter cylinder in a modified manner through said intermediate element.

6. In a hydro-pneumatic shock absorbing strut, a pneumatic cylinder, a piston therefor movable against pneumatic pressure to absorb shock, a hydraulic cylinder, a second piston movable against liquid in said hydraulic cylinder, said second piston being constructed to permit a metered amount of liquid to flow past it for absorbing shock, said two pistons being rigidly connected together, whereby the movement of one cylinder is communicable through the two pistons to the other cylinder in a modified degree.

RAYMOND L. GRUSS.

CERTIFICATE OF CORRECTION.

Patent No. 1,918,697.                                   July 18, 1933.

RAYMOND L. GRUSS, DECEASED, whose
Administratrix is LAURA E. GRUSS.

It is hereby certified that error appears in the printed specification of the above numbered patent requiring correction as follows: Page 3, line 101, claim 3, for "amount" read "around"; and that the said Letters Patent should be read with this correction therein that the same may conform to the record of the case in the Patent Office.

Signed and sealed this 22nd day of August, A. D. 1933.

M. J. Moore.

Acting Commissioner of Patents.

(Seal)

tional movement of the piston head within the pneumatic cylinder whereby the energy incident to the relative movement of the pneumatic cylinder and the hydraulic cylinder will be dissipated.

5. In a shock absorbing strut, an air cylinder, a hydraulic cylinder, and an intermediate element comprising two pistons each of which slides in one of said cylinders, the piston sliding in said hydraulic cylinder being constructed to permit a metered amount of liquid to flow past it, whereby the movement of one of said cylinders toward or away from the other cylinder is transmitted to the latter cylinder in a modified manner through said intermediate element.

6. In a hydro-pneumatic shock absorbing strut, a pneumatic cylinder, a piston therefor movable against pneumatic pressure to absorb shock, a hydraulic cylinder, a second piston movable against liquid in said hydraulic cylinder, said second piston being constructed to permit a metered amount of liquid to flow past it for absorbing shock, said two pistons being rigidly connected together, whereby the movement of one cylinder is communicable through the two pistons to the other cylinder in a modified degree.

RAYMOND L. GRUSS.

CERTIFICATE OF CORRECTION.

Patent No. 1,918,697.  July 18, 1933.

RAYMOND L. GRUSS, DECEASED, whose
Administratrix is LAURA E. GRUSS.

It is hereby certified that error appears in the printed specification of the above numbered patent requiring correction as follows: Page 3, line 101, claim 3, for "amount" read "around"; and that the said Letters Patent should be read with this correction therein that the same may conform to the record of the case in the Patent Office.

Signed and sealed this 22nd day of August, A. D. 1933.

M. J. Moore.

Acting Commissioner of Patents.

(Seal)

CERTIFICATE OF CORRECTION.

Patent No. 1,918,697.  July 18, 1933.

RAYMOND L. GRUSS, DECEASED, whose Administratrix is LAURA E. GRUSS.

It is hereby certified that error appears in the printed specification of the above numbered patent requiring correction as follows: Page 3, line 101, claim 3, for "amount" read "around"; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.